(12) United States Patent
Hsieh et al.

(10) Patent No.: US 8,339,359 B2
(45) Date of Patent: Dec. 25, 2012

(54) METHOD AND SYSTEM FOR OPERATING ELECTRIC APPARATUS

(75) Inventors: Chen-Chiung Hsieh, Taoyuan County (TW); Yao-De Chiu, Taipei (TW)

(73) Assignees: Tatung Company, Taipei (TW); Tatung University, Taipei (TW)

( * ) Notice: Subject to any disclaimer, the term of this patent is extended or adjusted under 35 U.S.C. 154(b) by 466 days.

(21) Appl. No.: 12/688,922

(22) Filed: Jan. 18, 2010

(65) Prior Publication Data

US 2011/0175802 A1    Jul. 21, 2011

(30) Foreign Application Priority Data

Dec. 10, 2009  (TW) ............................... 98142331 A

(51) Int. Cl.
*G09G 5/00* (2006.01)

(52) U.S. Cl. ....................................... 345/156; 345/163

(58) Field of Classification Search .................. 345/156, 345/163, 168, 169, 173; 348/77; 382/115, 382/103, 288, 291
See application file for complete search history.

(56) References Cited

U.S. PATENT DOCUMENTS

| | | | | |
|---|---|---|---|---|
| 6,002,808 A | * | 12/1999 | Freeman | 382/288 |
| 6,236,736 B1 | * | 5/2001 | Crabtree et al. | 382/103 |
| 2010/0021014 A1 | * | 1/2010 | Bebis | 382/115 |
| 2011/0102570 A1 | * | 5/2011 | Wilf et al. | 348/77 |

OTHER PUBLICATIONS

Chiu et al., "Virtual Multi-touch Screen Visual Hand Tracking by Single Camera", Symposium of Application and Management of Information Technology, Jun. 27, 2009.
Chiu, Yao-De, "Virtual Multi-touch Screen Visual Hand Tracking by Single Camera", Electronic Thesis or Dissertation, Aug. 31, 2009, retrieved from http://oai:ethesys.library.ttu.edu.tw:etd-0831109-121655.

* cited by examiner

*Primary Examiner* — Ricardo L Osorio
(74) *Attorney, Agent, or Firm* — Jianq Chyun IP Office

(57) ABSTRACT

A method and a system for operating an electric apparatus are provided. In the present invention, first, an image capturing unit is enabled for capturing an image. Next, a palm component on the image is detected. Afterwards, a center of mass in the palm component is calculated according to a principal component analysis (PCA) algorithm, so as to use the center of mass to simulate a cursor. Then, a width of the palm of the palm component is calculated. Finally, the width of the palm is compared with a threshold so as to execute a click action if the width of the palm is greater than the threshold.

17 Claims, 8 Drawing Sheets

METHOD AND SYSTEM FOR OPERATING ELECTRIC APPARATUS

CROSS-REFERENCE TO RELATED APPLICATION

This application claims the priority benefit of Taiwan application serial no. 98142331, filed on Dec. 10, 2009. The entirety of the above-mentioned patent application is hereby incorporated by reference herein and made a part of this specification.

BACKGROUND OF THE INVENTION

1. Field of the Invention

The present invention relates to a method for operating an electronic apparatus. More particularly, the present invention relates to a method and a system for operating an electronic apparatus by hand gesture.

2. Description of Related Art

In recent years, conventional input devices of electronic products are gradually replaced by other input manners, in which a hand gesture recognition system used for replacing the input device is the most popular. The hand gesture recognition system is widely used in various human-machine interaction interfaces, such as robot remote control, electric appliance remote control, and slide presentation operation, etc.

In a general environment, since there are a plenty of colors similar to a skin color, even when a hand moves in a same image, a detection error is probably occurred due to variation of a light source. To avoid influences of environmental factors (such as, light, background, and camera settings, etc.) that causes detection errors for a skin color, a hand or a face, most of the systems are designed to use a plurality of cameras, infrared cameras, or three-dimensional cameras to obtain three-dimensional coordinates of an object, or are designed to be only used under a pure background, so as to increase a recognition accuracy.

However, according to the present method, only the hand gesture recognition under the pure background can be achieved, which may cause a utilization inconvenience; or a plurality of cameras has to be used, which may increase a system cost, and a large amount of computations have to be performed to process the images, so that a processing efficiency is decreased.

SUMMARY OF THE INVENTION

Accordingly, the present invention is directed to a method for operating an electronic apparatus, by which the electronic apparatus can be intuitively operated through a general image capturing unit under a generally environment.

The present invention is directed to an operating system, which is configured to an electronic apparatus for recognizing hand gestures of a user, so as to operate the electronic apparatus.

The present invention provides a method for operating an electronic apparatus. First, an image capturing unit is enabled for capturing an image. Next, a palm component in the image is detected. Afterwards, a center of mass of the palm component is calculated according to a principal component analysis (PCA) algorithm, so as to use the center of mass to simulate a cursor. Then, a palm width of the palm component is calculated according to the PCA algorithm. Finally, the palm width is compared with a threshold, so as to execute a click action if the palm width is greater than the threshold.

In an embodiment of the present invention, after the step of capturing the image, a face recognition operation is executed to the image to obtain a face component. Then, a skin color sample of the face component is detected. Then, a hand component in the image is detected according to the skin color sample. Next, a feature projection of the hand component is calculated according to the PCA algorithm, so as to obtain the palm component.

In an embodiment of the present invention, the palm width of the palm component is calculated according to a feature projection of the palm component.

In an embodiment of the present invention, before the step of calculating the feature projection of the hand component, an edge detection is executed to the hand component to obtain an edge feature vector, and then the PCA algorithm is used to calculate the feature projection according to the edge feature vector.

In an embodiment of the present invention, the step of comparing the palm width with the threshold comprises comparing the palm width with a face area of a face component, so as to execute the click action when the palm width is greater than a quarter of the face area. Namely, a quarter of the face area is taken as the threshold. Moreover, the threshold can also be a palm width of a palm component in a reference image, and the reference image is a first image captured after the image capturing unit is enabled.

In an embodiment of the present invention, if another palm component in the image is detected, when a picture is browsed, a distance between centers of mass of the palm components is calculated, so as to zoom the picture according to the distance. Moreover, if another palm component in the image is detected, a rotation action is executed (for example, rotating the picture, etc.) according to the centers of mass of the palm components.

The present invention provides an operating system configured to an electronic apparatus, for operating the electronic apparatus. The operating system comprises an image capturing unit, an image processing module and a calculation module. The image capturing unit captures an image. The image processing module detects a palm component in the image, and calculates a center of mass of the palm component, and a palm width of the palm component according to a principal component analysis (PCA) algorithm. The calculation module uses the center of mass to simulate a cursor, and compares the palm width with a threshold, so as to execute a click action if the palm width is greater than the threshold.

In an embodiment of the present invention, the image processing module further executes a face recognition operation to the captured image to obtain a face component, so as to detect a skin color sample of the face component. Moreover, the image processing module detects a hand component in the image according to the skin color sample, and calculates a feature projection of the hand component according to the PCA algorithm, so as to obtain the palm component. Moreover, the image processing module further performs an edge detection to the hand component to obtain an edge feature vector, and uses the PCA algorithm to calculate the feature projection according to the edge feature vector.

In an embodiment of the present invention, the calculation module further determines whether the palm width is greater than a quarter of a face area, so as to execute the click action when the palm width is greater than a quarter of the face area. Moreover, the calculation module takes a first image captured after the image capturing unit is enabled as a reference image, and takes the palm width of the reference image as the threshold. If the captured image comprises another palm component, when a picture is browsed, the calculation module calculates a distance between centers of mass of the palm components, so as to zoom the picture according to the distance or execute a rotation action according to the centers of mass of the palm components.

According to the above descriptions, in the present invention, the center of mass and palm width of the palm component are analyzed, so as to control coordinates of the cursor according to the center of mass of the palm component, and determine an actual distance between the palm of the user and the image capturing unit according to the palm width. In this way, the user can use bare hands to control the electronic apparatus without using physical input devices such as a mouse, a keyboard or a remote controller, etc.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In recent years, conventional input devices of electronic products are gradually replaced by other input manners, in which a hand gesture recognition system used for replacing the input device is the most popular. To avoid influences of environmental factors (such as, light, background, and camera settings, etc.) that causes detection errors for a skin color, a hand or a face, most of the systems are designed to use a plurality of cameras, infrared cameras, or three-dimensional cameras to obtain three-dimensional coordinates of an object, or are designed to be only used under a pure background, so as to increase a recognition accuracy. However, prices of these cameras are expensive, or a high calculation amount is demanded. Therefore, an inexpensive and general camera and a human-machine interface with low calculation amount and less restrictions are required. Accordingly, the present invention provides a method and a system for operating an electronic apparatus, by which a single image capturing unit is used to achieve the hand gesture recognition under a complex background, so that a user can operate the electronic apparatus without touching a screen or using a physical input device.

Figure 1:
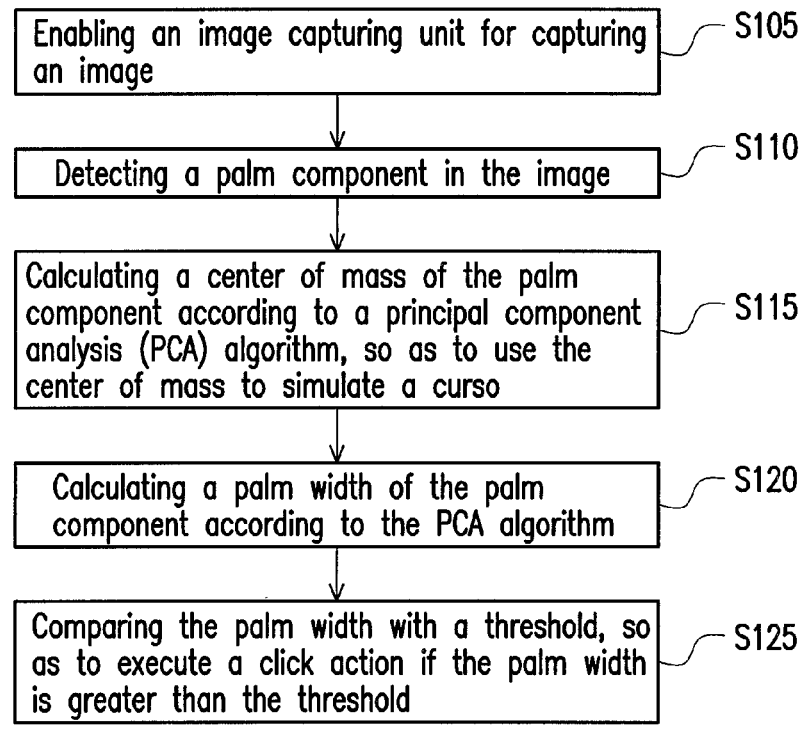
FIG. 1 is a flowchart illustrating a method for operating an electronic apparatus according to an embodiment of the present invention.

FIG. 1 is a flowchart illustrating a method for operating an electronic apparatus according to an embodiment of the present invention. Referring to FIG. 1, in step S105, the image capturing unit is enabled for capturing images. In the present embodiment, the image capturing unit is, for example, a web cam.

Figure 2:
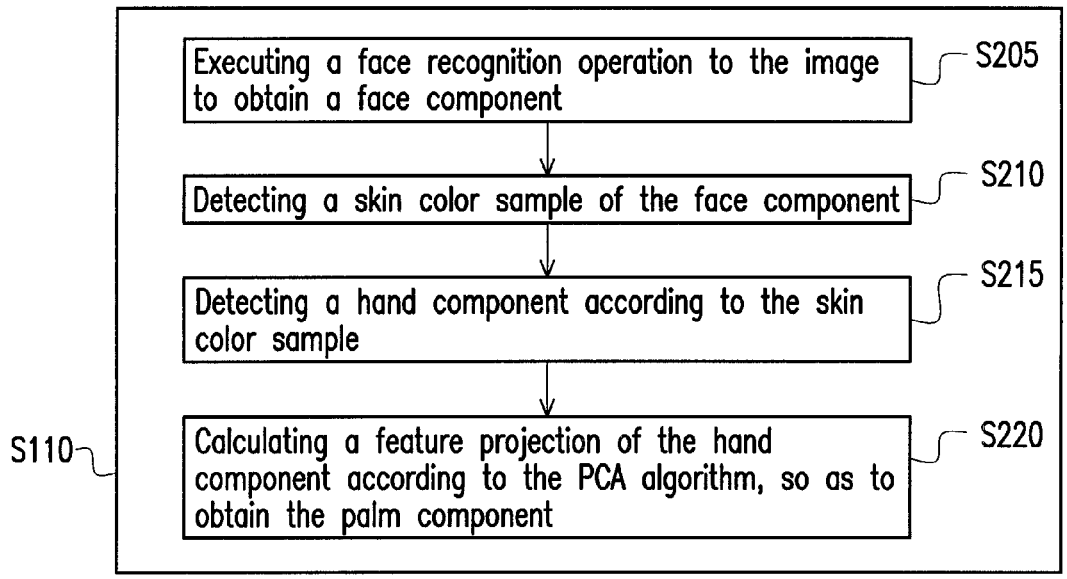
FIG. 2 is a flowchart illustrating a method of detecting a palm component according to an embodiment of the present invention.

Next, in step S110, a palm component in the image is detected. Another embodiment is provided below to describe the step of detecting the palm component in detail. FIG. 2 is a flowchart illustrating a method of detecting the palm component according to an embodiment of the present invention. Referring to FIG. 2, after the image is captured, in step S205, the electronic apparatus executes a face recognition operation (for example, a Harr-like feature is used to perform the face recognition operation) to the captured image to obtain a face component in the image.

Next, in step S210, an adaptive skin color detection is performed to detect a skin color sample of the face component. Next, in step S215, a hand component in the image is found according to the skin color sample, so as to obtain the palm component.

It should be noticed that in the present embodiment, the electronic apparatus can execute a connected component detection according to the skin color sample, so as to find similar pixels and obtain components having colors the same to the skin color sample. Then, a dynamic detection is performed to filter the non-hand components, so as to obtain the hand component. During the connected component detection, since a neck part is probably obtained at the same time, the dynamic detection can be used to filter slightly shifted skin color connectors and maintain dynamic skin color connectors, i.e. the hand component. The dynamic detection is mainly used to obtain a difference image by subtracting a background image from an input image in the same image space. Here, the dynamic detection updates the background in every 15 frames.

After the hand component is found, in step S220, a feature projection of the hand component is calculated according to a principal component analysis (PCA) algorithm, so as to obtain the palm component. In detail, a chain code analysis is performed to the detected hand component to find a portion above a wrist. The chain code refers to a method of representing a component boundary through a sequence connected by a straight line with a fixed length and direction, by which a direction vector of the component boundary can be obtained.

Referring to FIG. 1 again, after the palm component is found, in step S115, a center of mass of the palm component is calculated according to the PCA algorithm. For example, an average value of all points of the palm component is found to serve as the center of mass of the palm component. Then, the center of mass is used to simulate a cursor (mouse coordinates of a windows operating system).

Figure 3:
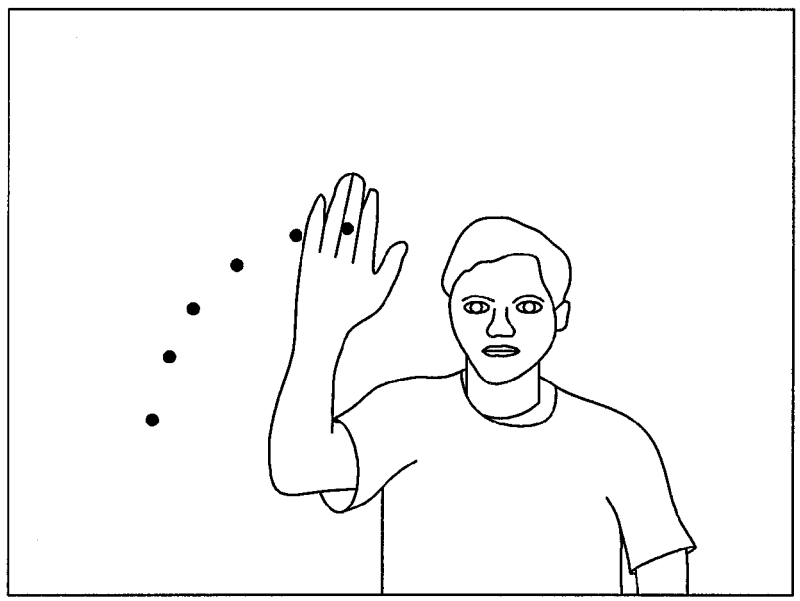
FIG. 3 is a schematic diagram illustrating a movement of a center of mass according to an embodiment of the present invention.

For example, FIG. 3 is a schematic diagram illustrating a movement of the center of mass according to an embodiment of the present invention. Referring to FIG. 3, a plurality of dots in FIG. 3 represents the centers of mass of the palm component of different images, and a moving track of these centers of mass is a moving track of the cursor.

Next, in step S120, a palm width of the palm component is calculated according to the PCA algorithm. Namely, the feature projection obtained according to the PCA algorithm is used to calculate the palm width. For example, an edge detection (for example, a Canny edge detection algorithm) is performed to obtain an edge feature vector of the hand component, and then the PCA algorithm is used to calculate the feature projection of the palm component according to the edge feature vector, so as to calculate the palm width according to the feature projection. By such means, a distance of the palm can be determined according to the palm width.

Finally, in step S125, the palm width is compared with a threshold, so as to execute a click action if the palm width is greater than the threshold. For example, whether the palm width is greater than a quarter of a face area is determined, and the click action is executed when the palm width is greater than a quarter of the face area.

Moreover, a first image captured after the image capturing unit is enabled is taken as a reference image, and the palm width of the reference image is taken as the threshold. For example, the system can record a using distance of the user in each of the images, wherein a size of the face area serves as the using distance. In case that the using distance is not changed, the palm width with a furthest distance in the images is stored (which is generally the palm width in the first image captured after the image capturing unit is enabled, though the present invention is not limited thereto). Moreover, the face area can also be taken into consideration, so as to avoid area variations of the palm component when a facing direction of the palm is changed from the face to the side, or the hand gesture is changed from a first to the spread palm.

Figure 4A:
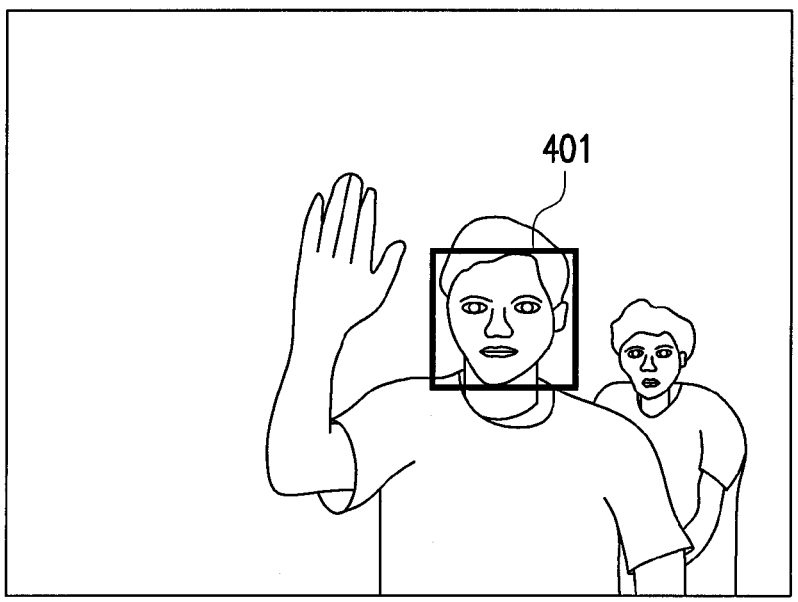
FIGS. 4A-4C are schematic diagrams illustrating detection of a palm component according to an embodiment of the present invention.
Figure 4B:
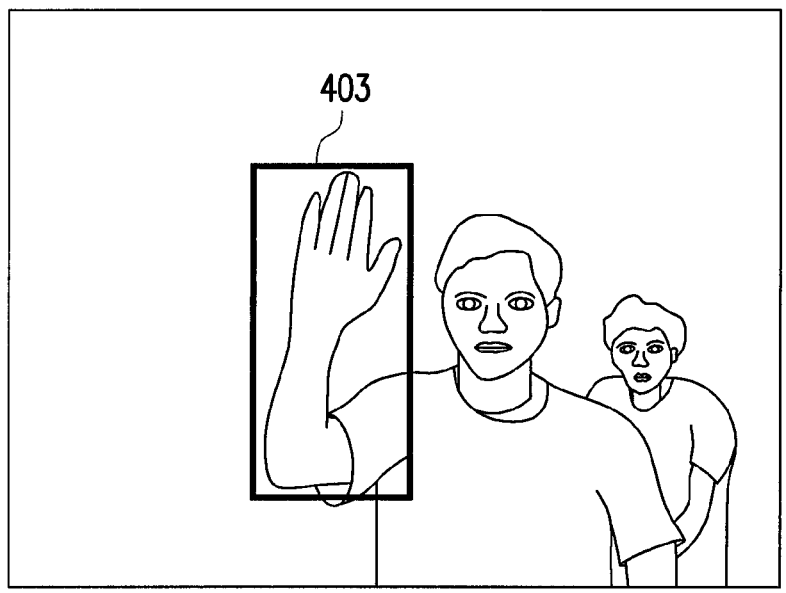
Figure 4C:
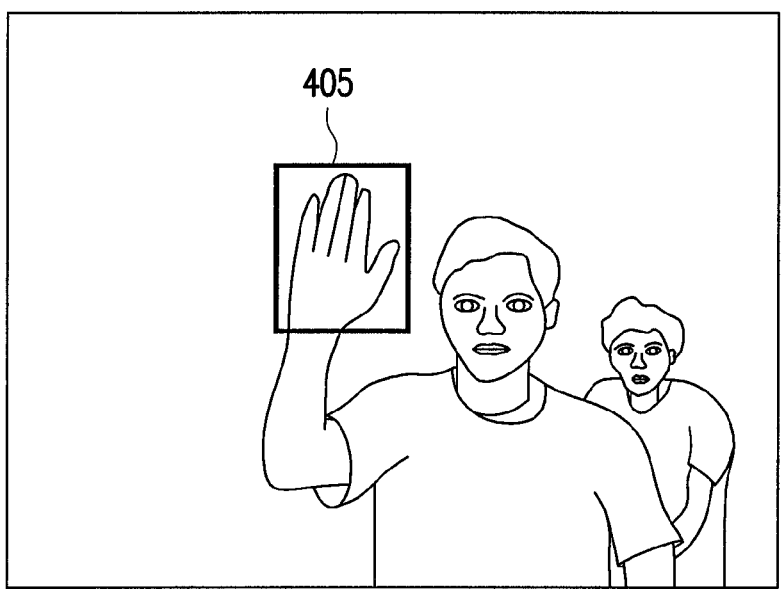

FIGS. 4A-4C are schematic diagrams illustrating detection of the palm component according to an embodiment of the present invention. Referring to FIG. 4A, first, a face component 401 in the image is recognized. Here, since there are two faces in the image, after the face components are obtained, the desired face component can be determined according to the face areas. Generally, the user of the electronic apparatus is usually the one closest to the electronic apparatus, so that the face component having the larges face area represents the user closest to the electronic apparatus. Moreover, when a plurality of face components is obtained, the user can select the correct face component by himself.

Next, in FIG. 4B, a hand component 403 in the image is obtained according to a skin color sample of the face component 401, as that described in the above step S215. Next, in FIG. 4C, a palm component 405 is extracted from the hand component 403, as that described in the above step S220.

Figure 5A:
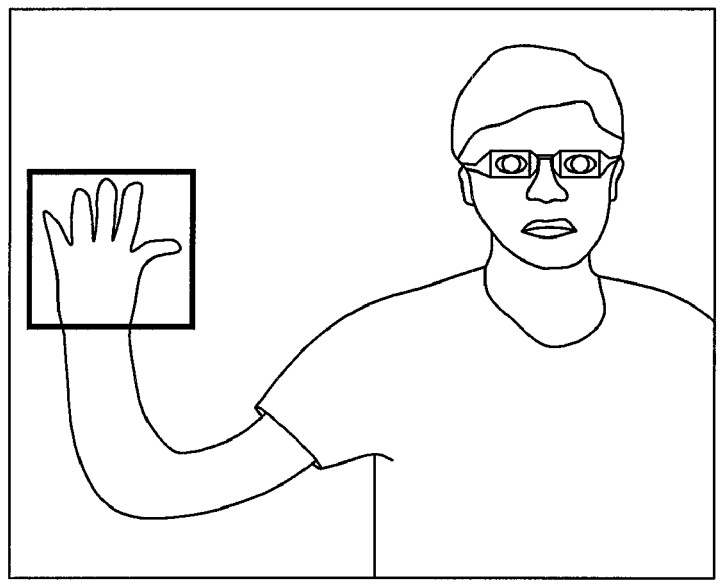
FIGS. 5A and 5B are schematic diagrams illustrating determination of a palm width according to an embodiment of the present invention.
Figure 5B:
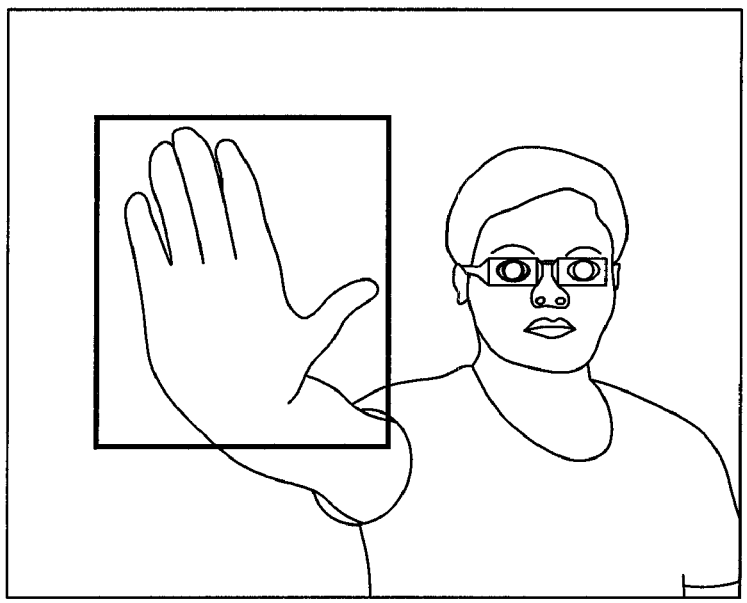
Figure 6A:
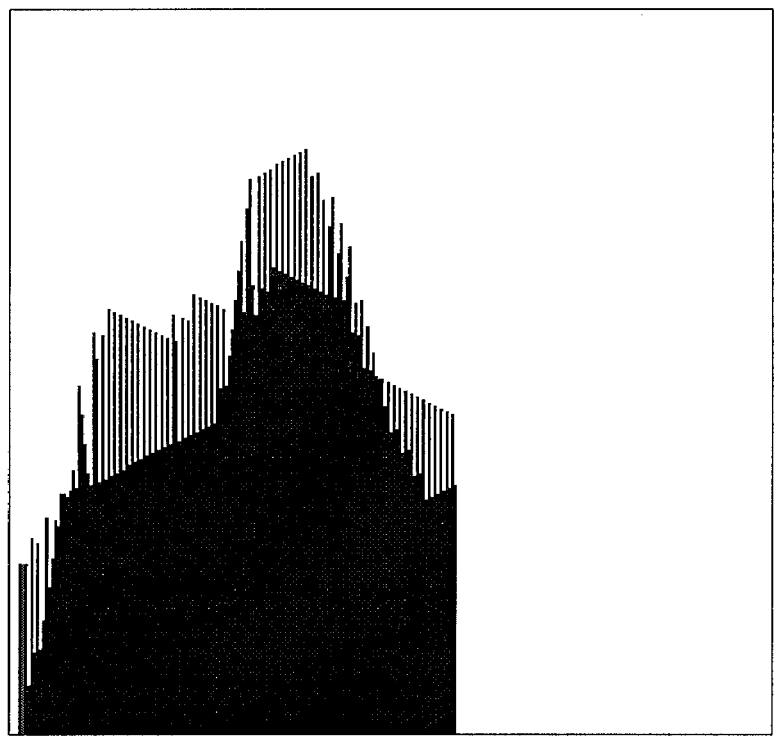
FIGS. 6A-6B are histograms of feature projections of palm components according an embodiment of the present invention.
Figure 6B:
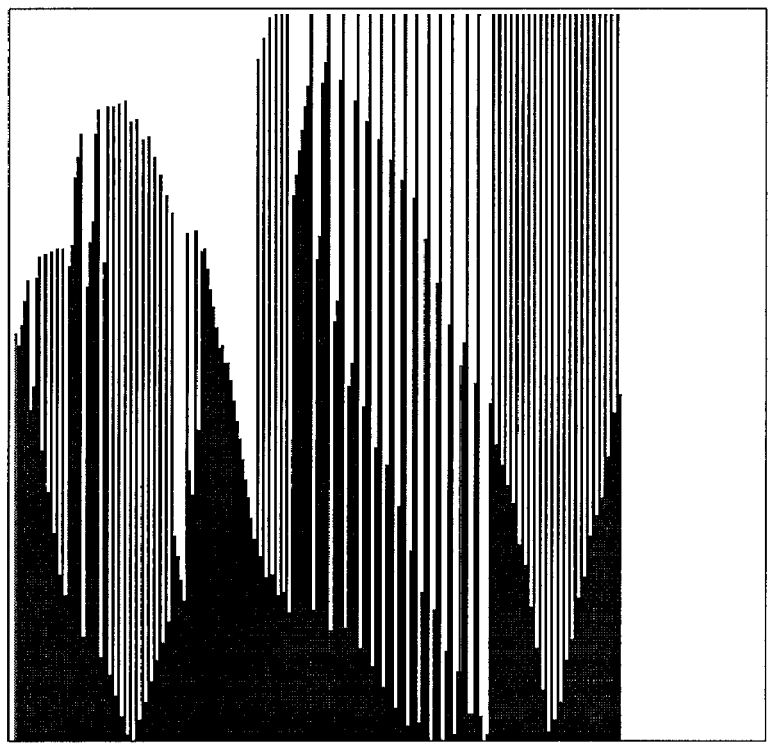

FIGS. 5A and 5B are schematic diagrams illustrating determination of a palm width according to an embodiment of the present invention. FIGS. 6A-6B are histograms of feature projections of palm components according an embodiment of the present invention. In the present invention, assuming FIG. 5B is an image obtained after the image of FIG. 5A is obtained. FIG. 6A and FIG. 6B are respectively histograms of the feature projections of the palm components of FIG. 5A and FIG. 5B. In FIG. 6A and FIG. 6B, an X axial direction represents projection points, and a Y axial direction represents projection distances. It is obvious that the projection distances of FIG. 6B are greater than that of FIG. 6A, so that the palm width of FIG. 5B is greater than that of FIG. 5A.

It should be noticed that based on a design concept of a touch screen, the function of control cursor built in the electronic apparatus can be used to design a virtual touch screen similar to the touch screen. Both hands can be simultaneously detected according to the aforementioned method, and if another palm component in the image is detected, when a picture is browsed, a distance between centers of mass of the palm components is calculated, so as to zoom the picture according to the distance, or execute a rotation action according to the centers of mass of the palm components.

Figure 7A:
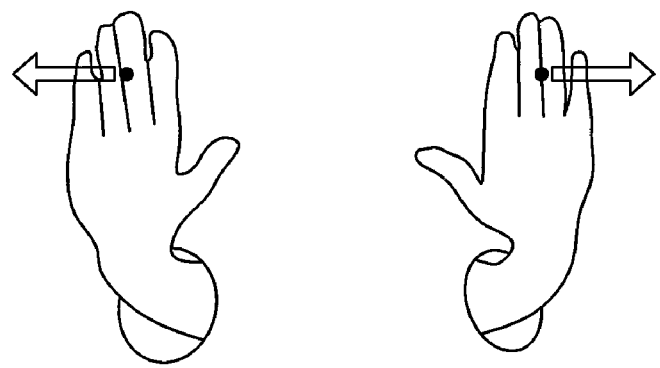
FIGS. 7A-7D are schematic diagrams illustrating moving tracks of both hands according to an embodiment of the present invention.
Figure 7B:
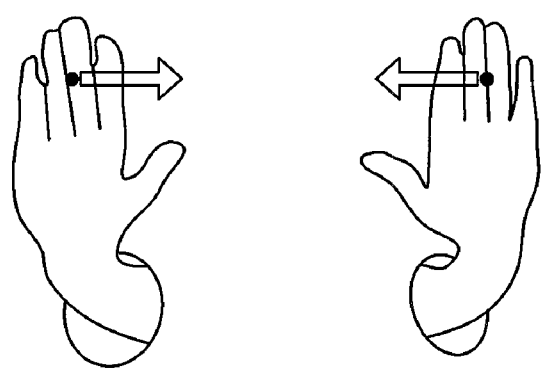
Figure 7C:
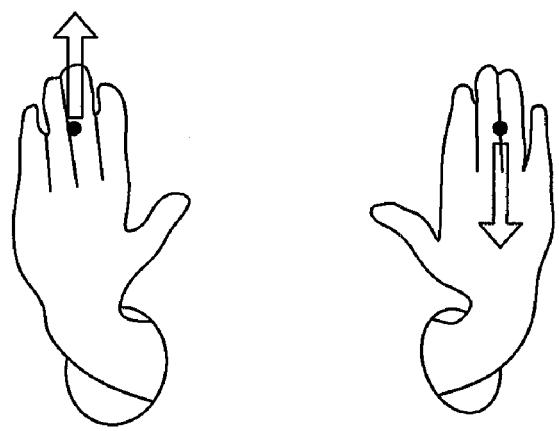
Figure 7D:
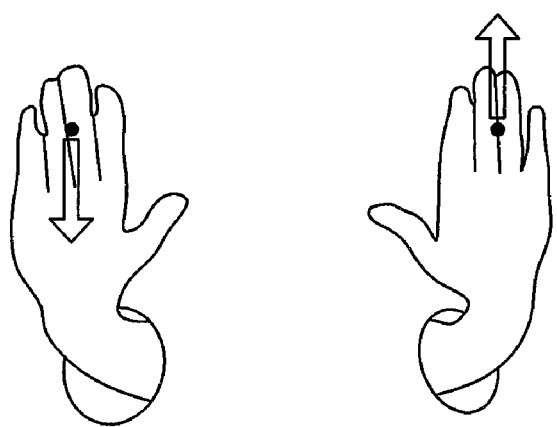

For example, FIGS. 7A-7D are schematic diagrams illustrating moving tracks of both hands according to an embodiment of the present invention. In FIG. 7A and FIG. 7B, the picture is zoomed according to a horizontal distance of the centers of mass of both hands. In FIG. 7A, it is defined that when the centers of mass of both hands depart from each other towards opposite directions along a horizontal axis, the picture is enlarged. In FIG. 7B, it is defined that when the centers of mass of both hands approach to each other towards opposite directions along the horizontal axis, the picture is contracted. In FIG. 7C and FIG. 7D, rotation of the picture is determined according to a vertical distance variation between the centers of mass of both hands, by which a right rotation is executed when the centers of mass of both hands move clockwise in opposite directions, as that shown in FIG. 7C, and a left rotation is executed when the centers of mass of both hands move anticlockwise, as that shown in FIG. 7D.

In addition, the present invention provides an operating system. Another embodiment is provided below for detailed description.

Figure 8:
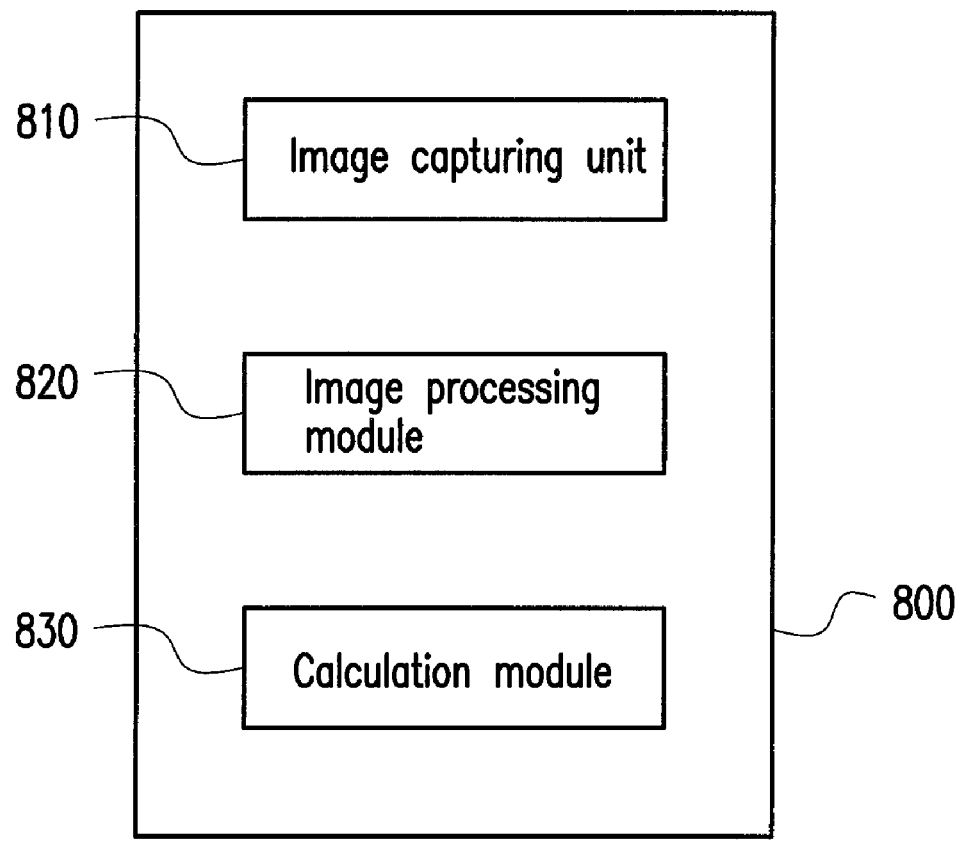
FIG. 8 is a block diagram illustrating an operating system according to an embodiment of the present invention.

FIG. 8 is a block diagram illustrating an operating system according to an embodiment of the present invention. Referring to FIG. 8, the operating system 800 can be configured in any electronic apparatus, so that the electronic apparatus can be operated through the operating system 800. Here, the operating system 800 includes an image capturing unit 810, an image processing module 820 and a calculation module 830.

The image capturing unit 810 is, for example, a web cam used for capturing an image. The image processing module 820 processes the captured image to obtain a palm component in the image, and calculates a center of mass and a palm width of the palm component. The calculation module 830 uses the center of mass to simulate a cursor of the window operating system, and determines a distance of the palm component according to the palm width, so as to determine whether or not to execute a click action.

In detail, the image processing module 820 executes a face recognition operation to the captured image to obtain a face component, so as to detect a skin color sample of the face component. Moreover, the image processing module 820 detects a hand component in the image according to the skin color sample, and calculates a feature projection of the hand component according to the PCA algorithm, so as to obtain the palm component. Moreover, the image processing module 820 further performs an edge detection to the hand component to obtain an edge feature vector, and uses the PCA algorithm to calculate the feature projection according to the edge feature vector.

The calculation module 830 determines whether the palm width is greater than a quarter of a face area, so as to execute the click action when the palm width is greater than a quarter of the face area. Moreover, the calculation module 830 takes a first image captured after the image capturing unit 810 is enabled as a reference image, and takes the palm width of the reference image as the threshold. If the captured image comprises another palm component, when a picture is browsed, the calculation module 830 calculates a distance between centers of mass of the palm components, so as to zoom the picture according to the distance, or execute a rotation action according to the centers of mass of the palm components.

Moreover, the aforementioned operating system can also be applied to a car racing game, in which acceleration of a car is control by the click action, and steering of the car is controlled by the rotation operation.

In summary, according to the above embodiments, only a single image capturing unit is used to develop a virtual touch control human-machine interface. Namely, the center of mass of the palm component is used to control the coordinates of the cursor, and the palm width is used to determine an actual distance between the palm of the user and the image capturing unit, so as to determine whether or not execute the click action. In this way, the user can use bare hands to control the electronic apparatus without using physical input devices such as a mouse, a keyboard or a remote controller, etc. Moreover, the skin color sample of the face component is used to find a component in the image that has the same skin color, and then it is determined whether such component is the hand component, so as to improve a recognition rate of the hand component.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for operating an electronic apparatus, comprising:
    enabling an image capturing unit for capturing an image;
    detecting a skin color sample of a face component in the image;
    detecting a hand component in the image according to the skin color sample;
    calculating a feature projection of the hand component according to a principal component analysis (PCA) algorithm, so as to obtain a palm component;
    calculating a center of mass of the palm component according to the PCA algorithm, so as to use the center of mass to simulate a cursor;
    calculating a palm width of the palm component according to the PCA algorithm; and
    comparing the palm width with a threshold, so as to execute a click action if the palm width is greater than the threshold.

2. The method for operating the electronic apparatus as claimed in claim 1, wherein after the step of capturing the image, the method further comprises:
    executing a face recognition operation to the image to obtain the face component.

3. The method for operating the electronic apparatus as claimed in claim 1, wherein the step of calculating the palm width of the palm component comprises:
    calculating the palm width according to a feature projection of the palm component.

4. The method for operating the electronic apparatus as claimed in claim 1, wherein before the step of calculating the feature projection of the hand component, the method further comprises:
    executing an edge detection to the hand component to obtain an edge feature vector, and using the PCA algorithm to calculate the feature projection according to the edge feature vector.

5. The method for operating the electronic apparatus as claimed in claim 1, wherein the step of comparing the palm width with the threshold comprises:
    comparing the palm width with a face area of a face component.

6. The method for operating the electronic apparatus as claimed in claim 5, wherein the click action is executed when the palm width is greater than a quarter of the face area.

7. The method for operating the electronic apparatus as claimed in claim 1, further comprising:
    taking a first image captured after the image capturing unit is enabled as a reference image, and taking a palm width of the reference image as the threshold.

8. The method for operating the electronic apparatus as claimed in claim 1, further comprising:
    calculating a distance between centers of mass of the palm components if another palm component in the image is detected and when a picture is browsed, so as to zoom the picture according to the distance.

9. The method for operating the electronic apparatus as claimed in claim 1, further comprising:
    executing a rotation action according to centers of mass of the palm components if another palm component in the image is detected.

10. An operating system, configured to an electronic apparatus, the operating system comprising:
    an image capturing unit, for capturing an image;
    an image processing module, for detecting a skin color sample of a face component in the image, detecting a hand component in the image according to the skin color sample, calculating a feature projection of the hand component according to a principal component analysis (PCA) algorithm, so as to obtain a palm component, and calculating a center of mass of the palm component, and a palm width of the palm component according to the PCA algorithm; and
    a calculation module, using the center of mass to simulate a cursor, and comparing the palm width with a threshold, so as to execute a click action if the palm width is greater than the threshold.

11. The operating system as claimed in claim 10, wherein the image processing module further executes a face recognition operation to the image to obtain the face component.

12. The operating system as claimed in claim 10, wherein the image processing module further calculates the palm width according to a feature projection of the palm component.

13. The operating system as claimed in claim 10, wherein the image processing module further performs an edge detection to the hand component to obtain an edge feature vector, and uses the PCA algorithm to calculate the feature projection according to the edge feature vector.

14. The operating system as claimed in claim 10, wherein the calculation module further determines whether the palm width is greater than a quarter of a face area, so as to execute the click action when the palm width is greater than a quarter of the face area.

15. The operating system as claimed in claim 10, wherein the calculation module takes a first image captured after the image capturing unit is enabled as a reference image, and takes the palm width of the reference image as the threshold.

16. The operating system as claimed in claim 10, wherein if the image comprises another palm component, when a picture is browsed, the calculation module calculates a distance between centers of mass of the palm components, so as to zoom the picture according to the distance.

17. The operating system as claimed in claim 10, wherein the calculation module further executes a rotation action according to centers of mass of the palm components if the image comprises another palm component.

* * * * *